May 8, 1945. O. A. WIRKKALA 2,375,719
SHACKLE
Filed March 21, 1944

INVENTOR.
OSCAR A. WIRKKALA
BY
Cook & Robinson
ATTORNEYS

Patented May 8, 1945

2,375,719

UNITED STATES PATENT OFFICE 2,375,719

SHACKLE

Oscar A. Wirkkala, Seattle, Wash.

Application March 21, 1944, Serial No. 527,414

10 Claims. (Cl. 294—78)

This invention relates to logging equipment, and has reference more particularly to improvements in shackles, and shackle connections as used with various types of logging hooks and other devices for their attachment to wire ropes or cables; it being the principal object of this invention to provide a shackle embodying novel features, especially in the provision of a shackle pin of novel form that may be easily applied, securely fixed in place, and readily removed when such is required, and which eliminates, to a maximum extent, the wear on the eye splice of the attached cable and also overcomes the usual tendency to flatten and damage the cable at its point of contact with the pin under the excessive strain that is applied thereto in use.

It is also an object of the invention to provide a shackle and pin combination wherein the pin ends are within or flush with the walls of the shackle body and thus do not become fouled by contact with other objects.

More specifically stated, the objects of this invention reside in the provision of a shackle provided with novel means for a free swiveling connection with a hook or other device, and wherein a pin is provided for the attachment of the shackle to the eye splice of the connected cable; said pin being seated at its ends in openings of spaced apart side members of the shackle body and formed between its ends with an upwardly arched portion forming a rounded seat that conforms to the seat of the eye splice of the cable applied thereto.

Still further objects of the invention reside in the details of construction of the various parts in the shackle and pin; in their combination with a hook of novel form and in their mode of use, as will hereinafter be fully described.

In accomplishing these and other objects of the invention, I have provided the improved details of construction, the preferred forms of which are illustrated in the accompanying drawing, wherein—

Figure 1:
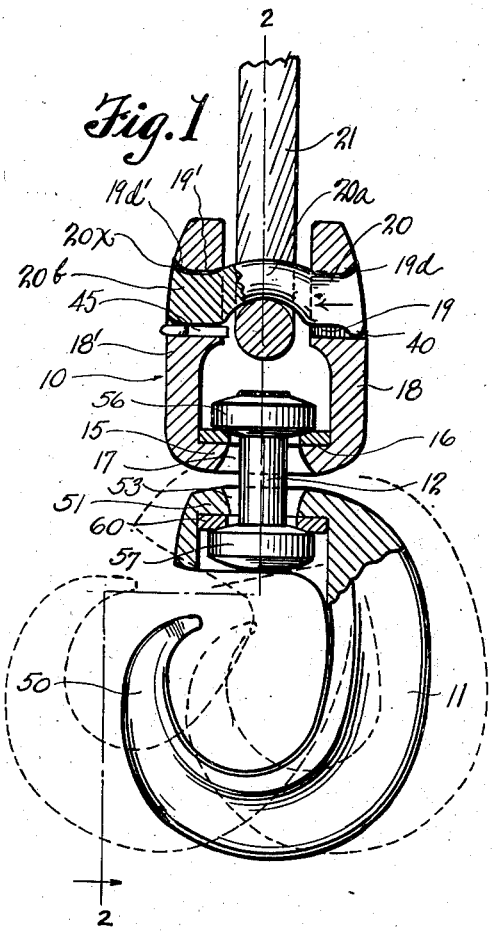
Fig. 1 is a view showing the present shackle and its swivel connection with the novel hook; the shackle body and certain parts of the shackle pin and hook being shown in section for purpose of better illustration and understanding.

Referring more in detail to the drawing—

In the present instance, I have illustrated the shackle embodied by this invention as applied to a logging hook of a special kind, but it is to be understood that the type of hook is of no particular significance so long as it is not inconsistent with the invention. The shackle, as here shown, is designated in its entirety by numeral 10, while the hook is designated in its entirety by numeral 11, and the swivel connecting bolt between shackle and hook is designated by numeral 12.

The shackle 10 comprises a horizontal base portion 15, formed centrally with an upwardly opening seat 16 formed about a centrally located opening 17. Cast integrally with the base portion 15, at opposite sides of the said seat, are spaced, upwardly extending side walls 18 and 18', in substantially parallel planes and formed, respectively, with horizontally alined openings 19 and 19' wherein the opposite ends of the shackle pin, designated in its entirety by numeral 20, are seated for the securement of the shackle to the eye-splice portion 21 formed at the end of a wire rope or cable.

Figure 2:
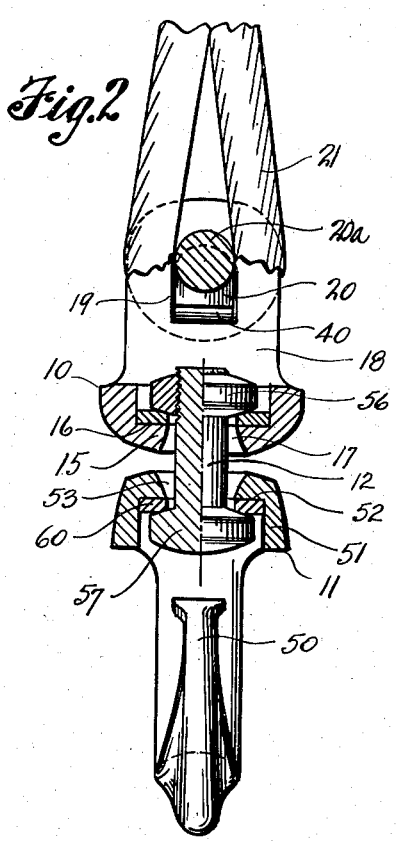
Fig. 2 is a section of the parts as seen on line 2—2 in Fig. 1.

The cable eyesplice 21, as noted best in Figs. 1 and 2, is looped about the central portion of the pin. This part 20a of the pin, as seen best in Fig. 2, is round in cross section and also is upwardly arched, as noted in Fig. 1, so that that part of the pin against which the loop of the cable directly bears, is so shaped as to conform to the normal shape of the cable and thus avoid the tendency to flatten the cable strands under heavy strain, and the incident damage and excessive wear thereon.

Figures 4, 5:
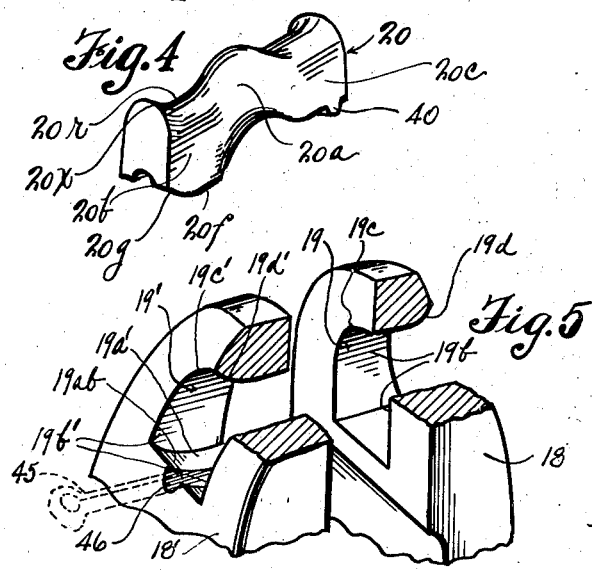
Fig. 4 is a perspective view of the shackle pin removed from the shackle.
Fig. 5 is a perspective view of parts of the opposite side walls of the shackle body, with sections broken away to better show the formation of the openings therein which are to contain the ends of the shackle pin.

By reference to Fig. 5, it is to be noted that the side wall opening 19 has a flat horizontal bottom surface 19a, vertical side walls 19b and an arched top wall 19c which, at the outer edge is upwardly curved as at 19d. Likewise, the opposite wall opening 19' has a flat bottom wall portion 19a' formed with an upwardly curved portion 19ab leading to the outside of the wall, vertical opposite side walls 19b' and a rounded or arched top wall 19c' that also curves upwardly as at 19d' to the outside of the opening.

The opposite end portions of the pin, designated in Fig. 4 at 20b and 20c respectively, are shaped to be seated in the openings by applying the pin to the shackle from the right hand side as seen in Fig. 1, and the opposite end surfaces of the pin are shaped to lie flush with the outer surfaces of the walls when the pin is fully applied, as will be seen in Fig. 1, thus to avoid any possibility of fouling. The left hand end portion 20b of the pin, as shown in Fig. 4, has a flattened bottom surface 20f somewhat upwardly curved, as at 20g toward the end of the pin, to conform to the shape of the bottom surface of the opening 19' to which it is applied in use. The opposite side surfaces of this end portion of the pin are flattened and substantially parallel and the top surface is transversely arched or rounded as at 20r and has an upwardly directed end flange as at 20x. The end portion 20c of the pin corresponds substantially in shape to end portion 20b except that instead of an upwardly curved bottom surface, it is formed with a transverse rib 40 on its under side.

In applying the pin to the shackle body, it is projected endwise into the alined openings 19 and 19' in the direction indicated by the arrow thereon in Fig. 1. It is to be understood that there is sufficient clearance between the top and bottom walls of these openings for the pin to pass through to assume the position shown in Fig. 1.

Figure 3:
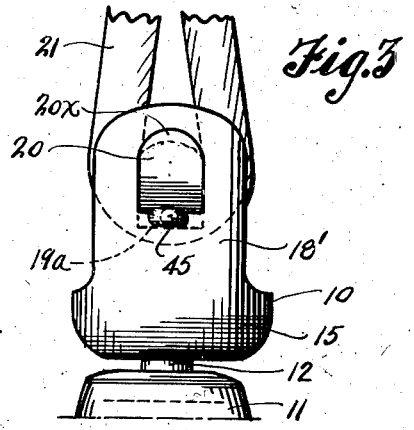
Fig. 3 is a view showing the shackle body side wall and an end of the shackle pin as applied thereto, also showing the cotter key applied to lock the pin in place.

When the left hand end portion 20b of the pin enters opening 19' and its rounded bottom surface 19g rides up on the upwardly inclined base surface 19ab of the opening, this end portion will be so lifted as to locate the transverse, upwardly extending flange 20x in a position at which it will engage the upwardly rounded top surface 19d' of the opening, thus to lock the pin against withdrawal. To hold the pin in this locked position, a cotter key 45 is inserted in the opening 19' beneath that end portion of the pin as shown in Figs. 1 and 3. The key is inserted lengthwise of the pin and is held in a groove 46 in the bottom wall of opening 19'. The inner ends of the key would be bent back against the inner surfaces of the wall to keep the key from pulling out. When the pin 20 is applied to the openings as herein illustrated, the transverse rib 40 on the under side of the right-hand end portion, rides onto the base wall 19a of the opening 19 and lifts that end of the pin into locked relationship with the top surface of the opening 19.

With the pin applied and locked, the eye splice of the cable will engage only with the upwardly arched, and rounded central portion 20a.

To remove the pin, it is only required that the cotter key 45 be withdrawn, and the pin 20 pushed out in a direction opposite to that of its application.

The hook 11 that is herein shown as secured to the shackle has an upwardly turned hook point 50 and a base portion 51 overlying the hook seat. The base portion 51 is formed with a downwardly opening socket 52 and with an opening 53 centrally of the socket. The swivel bolt 12 extends through the base opening 17 of the shackle and opening 53 of the hook and is provided at its ends with knobs 56 and 57 to lock the parts together in a free swiveling connection, with clearance between the shackle base and hook base for swinging of the hook in different directions as indicated in dotted lines in Fig. 1.

Preferably hardened washers 60 are located in the bases of the slots with spherically curved surfaces to engage with correspondingly rounded bearing surfaces of the knobs to insure the desired free swiveling action.

Note also is to be taken of the flared formation of the openings 17 and 53 through the bases of the shackle and hook to give the necessary clearance for the swinging or angular movement of the hook relative to the shackle.

The special advantages in the present type of shackle are the securment or removal of the pin without use of wrenches; the flush end surfaces of the pin with the shackle body that avoids fouling; the rounded seat that eliminates wear and flattening of the cable; the ease of applying and removing the pin, and the free swiveling action of the connection.

Having thus described my invention, what I claim as new therein and desire to secure by Letters Patent is:

1. A shackle comprising opposite side walls, spaced to receive a cable eye splice between them and having alined openings therein, and a shackle pin applied to the shackle and having opposite end portions thereof seated in said wall openings, one end portion of the pin having a flange projecting from an edge thereof at the pin end to holdingly engage a corresponding edge of the wall opening to lock the pin against withdrawal, and a key removably applied to the wall opening at the side of the pin opposite the flange to retain the flange of the pin thus engaged.

2. A shackle as in claim 1 wherein the shackle pin has its cable seating portion upwardly arched to seat the cable eye splice therein and forming a seat that is curved to conform to the radial curvature of the cable and to the curvature of the eye splice seat.

3. A shackle comprising opposite side walls, spaced to receive a cable eye splice between them and having alined openings therein and a shackle pin applicable endwise to the openings from one side of the shackle and having opposite end portions thereof designed to be seated in the said wall openings; one end portion of the pin having a lateral flange at its outer end to engage a corresponding edge of the wall opening to limit the extent of insertion of the pin in its functional to the shackle, the other end portion of the pin having a lateral flange at its end to be engaged with an edge of the corresponding wall opening to lock the pin against withdrawal when fully applied, and a key applied to that wall opening to support that end of the pin with its flange in holding contact with the wall; said key being removable for disengaging the flange to permit withdrawal of the pin.

4. A shackle comprising opposite side walls, spaced to receive a cable eye splice between them and having alined openings therein and a shackle pin applicable endwise to the openings from one side of the shackle and having opposite end portions thereof designed to be seated in the said wall openings; one end portion of the pin having a lateral flange at its outer end to engage a corresponding edge of the wall opening to limit the extent of insertion of the pin in its functional application to the shackle, the other end portion of the pin having a lateral flange at its end to be engaged with an edge of the corresponding wall opening to lock the pin against withdrawal when fully applied, and a key applied to that wall opening to support that end of the pin with its flange in holding contact with the wall; said key being removable for disengaging the flange to permit withdrawal of the pin, and said pin ends being flattened on bottom and opposite sides and rounded across the top side and fitted in said openings to prevent turning of the pin in its containing openings.

5. A shackle as in claim 1 wherein the opening through the shackle wall that receives the pin locking key therein is formed with a curved surface along which the end portion of the pin will slide, in inserting the pin, to cause the pin end to be lifted to engage the lateral flange thereof with the edge of the wall opening to lock the pin against withdrawal.

6. A shackle as in claim 1 wherein the opening through the shackle wall that receives the pin locking key therein is formed with a curved surface along which the end portion of the pin will slide, in inserting the pin, to cause the pin end to be lifted to engage the lateral flange thereof with the edge of the wall opening to lock the pin against withdrawal, and there being a channel in the said curved surface, in the longitudinal direction of the pin, to receive said key.

7. A shackle comprising opposite side walls, spaced to receive a cable eye splice between them and having alined openings therein, and a shackle pin applicable to the shackle from one side thereof and having opposite end portions thereof designed to be seated in the wall openings; one end portion of the pin being applicable through both wall openings for seating the pin and the other end portion having a lateral flange at one side and a rib at its other side to engage one wall of the corresponding opening when the pin is inserted to lift the flange into holding contact with an edge of the wall opening to limit the extent of insertions of the pin; the other end of the pin having a flange across one edge to engage an edge of the containing opening to prevent withdrawal of the pin, and a key applied to the opening beneath the pin to lift its flange into holding contact with the edge of the opening.

8. In combination, a shackle having a base opening, a hook having a base portion formed with an opening, and a swivel bolt extended through said openings and having heads at its ends for engaging the base of the shackle and base of the hook about the openings therein, to effect a free swiveling connection.

9. In combination, a shackle having a base formed with an opening therethrough and a countersunk seat about the opening, a hook having a base portion formed with an opening therethrough and having a countersunk seat about the opening and a swivel bolt extended through the said openings, rounded heads on the opposite ends of the bolt, and pivotally and rotatably engaged in the seats to permit free swiveling action of the hook and shackle.

10. In combination, a shackle having a base formed with an opening therethrough and a countersunk seat about the opening, a hook having a base portion formed with an opening therethrough and having a countersunk seat about the opening and a swivel bolt extended through the said openings, rounded heads on the opposite ends of the bolt, and pivotally and rotatably engaged in the seats to permit free swiveling action of the hook and shackle, and hardened washers fitted in the said seats and having spherically cupped surfaces against which the rounded heads of the swivel bolt engage.

OSCAR A. WIRKKALA.